United States Patent [19]
Kurosu et al.

[11] Patent Number: 5,381,837
[45] Date of Patent: Jan. 17, 1995

[54] MIXING APPARATUS FOR POWDER MATERIALS

[75] Inventors: Hidetsugu Kurosu; Mituo Hosono, both of Tokyo, Japan

[73] Assignee: Tsukishima Kikai Co., Ltd., Tokyo, Japan

[21] Appl. No.: 62,539

[22] Filed: May 18, 1993

[30] Foreign Application Priority Data

Dec. 24, 1992 [JP] Japan ................... 4-357289

[51] Int. Cl.⁶ .................. B01F 3/18; B01J 4/00
[52] U.S. Cl. .................. 141/103; 141/104; 141/83; 141/128; 366/141; 366/152; 366/158; 366/18; 222/238; 222/271; 222/278; 222/413
[58] Field of Search ............. 141/9, 11, 69, 83, 100, 141/103, 104, 128, 256, 283; 222/238, 271, 278, 413; 366/18, 141, 151, 152, 154–156, 158, 160

[56] References Cited

U.S. PATENT DOCUMENTS

| | | | |
|---|---|---|---|
| 2,674,396 | 4/1954 | Peterson | 222/238 X |
| 2,953,460 | 9/1960 | Baker | 141/83 X |
| 3,178,066 | 4/1965 | Martin | 222/238 X |
| 3,602,380 | 8/1971 | Spencer | 222/238 X |

FOREIGN PATENT DOCUMENTS

| | | | |
|---|---|---|---|
| 2333520 | 7/1974 | Germany | 222/413 |
| 3837608 | 5/1989 | Germany | 222/238 |
| 0434511 | 4/1948 | Italy | 141/83 |
| 3245830 | 11/1991 | Japan . | |

Primary Examiner—J. Casimer Jacyna
Attorney, Agent, or Firm—Oblon, Spivak, McClelland, Maier, & Neustadt

[57] ABSTRACT

A new powder mixing apparatus can mix a plurality of materials in a limited area of installment of apparatus by providing a plurality of container devices on both sides of a movement device so that the movement device carrying a mixing vessel can move reciprocally between the container devices of the both sides.

7 Claims, 14 Drawing Sheets

MIXING APPARATUS FOR POWDER MATERIALS

BACKGROUND OF THE INVENTION

The present invention relates to an apparatus for mixing or combining a fixed amount of a plurality of powder materials of different ingredients.

In many industrial fields such as medical, phamaceutical and food industries, a plurality of powder materials having different ingredients is combined or mixed in a predetermined ratio with respect to each material.

In a conventional apparatus for measuring and mixing a predetermined amount of the different materials, a number of containers for holding many kinds of materials are provided and a suitable amount of the materials is selectively taken out of the selected chambers into a single mixing container and, similarly, the powder materials of different containers are supplied to the mixing container to be mixed.

However, each container needs a driving system for discharging the material contained in each of the containers. If a great number of containers for holding the materials are necessary, each of the containers needs such a driving system, which necessitates a great amount of cost. Further, if any one of the driving system becomes out of order or inoperable by some reasons, the entire mixing apparatus must be stopped and maintenance and inspection must be continuously done so as to avoid such a failure of the operation, which, however, requires substantial labor and expense.

Further, when the mixing apparatus is entirely controlled automatically, the system for controlling a number of driving devices becomes complex.

The applicant considered the above described problems encountered to the conventional mixing apparatus and proposed some improvements as described in Japanese Patent Application No. 2-42797, filed Feb. 23, 1990, published under Publication No. 3-245830 (unexamined) on Nov. 1, 1991, hereinafter referred to as Japanese publication.

The apparatus disclosed in the Japanese publication has, as shown in FIG. 15, a container device A and a movement device B.

The container device A has, as a basic structure, a container vessel b for containing therein powdery materials, wherein the term "powder materials" used herein intends to include materials in the form of not only powders but also granules and other small particles, and a screw conveyer c, and a plurality of the similar container devices A are arranged in series.

The movement device B is disposed along the arrangement of the container devices A. The movement device B has driving device f on a carriage e which is movable along rails d and a container h which is weighed by a weighing device above the driving device f.

The driving device f has a motor i and a connector j, which are reciprocally movable toward and away from the container device A.

The movement device B is reciprocally movable along the length of the rail d and can be stopped at the selected container device A. When the movement device B is stopped at the selected position and the motor is moved forward, the connector j is connected with the connector l of the container device A to rotate the screw conveyer c through sprockets m, n and a chain o.

The screw conveyer c can supply the powder material in the container vessel b to the mixing container h. The supplied powder has been weighed by the weighing device g and, at the predetermined level of the supply, the motor i is stopped. Then the motor i is returned to the original position and the connectors j, l are released to stop the rotation of the screw conveyer c. Thus, the supply of the powder material into the container h is stopped.

Then the movement device B is moved to the next selected container device A and the similar operation of powder supply as described above is carried out.

The container devices A contain different powdery materials, and the predetermined amount of the different powder materials are supplied to the combining container h, which are then mixed and delivered to the production line.

In the apparatus disclosed in the Japanese publication described above, a single movement device B is moved along the plurality of movement devices A and stopped at the selected container devices A to selectively supply different powder materials into the combining container h and, accordingly, it is not necessary to provide a driving mechanism of the screw conveyer c to each of the container devices A.

However, since the container devices A are arranged in the serial direction, the same number of conveyer devices are required as the number of the powder materials so that each material is contained in independent container device if a plurality of materials are combined and, therefore, a great number of container devices A in series arrangement are required, which also requires a large and long installment area and extremely long rails for the movements device B.

The powder materials contained in the container devices b is taken out by the rotation of the screw conveyer c and discharged from the outlet p. The discharge volume of the conveyer c, however, is always fixed and not variable from the start of taking out of the powder material by the start of rotation of the screw conveyer to the end of the taking-out operation by the stop of the screw conveyer c, since the diameter and pitch of the vanes of the screw conveyer is fixed. Thus, it is impossible to change or adjust the discharging volume of the powder materials.

Although the powder materials supplied into the mixing container h is weighed by the weighing device or gage g, the powder material remained adjacent to the outlet p is also discharged by the rotational inertia of the screw conveyer c even after the volume of supply reached the predetermined level and the motor i is stopped. Consequently, more than the predetermined volume of the powder material is supplied, which fails in providing a constant volume of the materials and results in failure in properties of final products.

SUMMARY OF THE INVENTION

An object of the present invention is to provide an improvement which can mix a plurality of materials in a limited area of installment of apparatus by providing a plurality of container devices on the both sides of the movement device so that the movement device carrying a mixing vessel can move reciprocally between the container devices of the both sides.

Another object of the present invention is to provide a new apparatus for mixing the powder materials which permits to adjust the discharge volume of the materials by providing a large conveyer and a small conveyer so that a constant volume of the materials can be always discharged by the combination of the large and small conveyers.

In order to solve the problems described above, the present invention provides a mixing apparatus comprising:

(a) a plurality of container devices arranged in a serial manner and in parallel, symmetrical relation, each container device comprising:
a base,
a container vessel on the base for containing therein powder material to be mixed,
a conveyer means at lower portion of the container vessel,
an agitating means t an upper portion of the container vessel for agitating the materials in the container vessel, and
a driving mechanism for operating the conveyer means and the agitating means, and (b) a movement device, movable along the parallel-arranged container devices, having a driving device so that the driving device is releasably connected with the driving mechanism to thereby drive the driving mechanism of the container device, and a mixing vessel having a weighing device for checking a weight of the powder materials supplied from the conveyer deice into the mixing vessel.

In a preferred embodiment of the invention, the conveyer means has a pair of screw conveyers consisting of a large conveyer having a large screw vane of a large diameter and large pitch on a rotary shaft and a small conveyer having a small screw vane of a small diameter and small pitch on another rotary shaft. The rotary shafts of the conveyers are extended out of the container vessel and the outwardly extended portions of the rotary shafts are coupled with cam clutches which rotate in different rotational direction with each other and gears, and the gears are coupled with each other.

The driving means for the conveyer and the bridge breaker has joints at one end of the rotary shafts and sprockets at the other end thereof, and the sprocket is engaged with a sprocket of the rotary shaft of the conveyer device, and that the sprocket is engaged with a sprocket of the rotary shaft of the bridge breaker.

Further, the driving device has a pair of motors and a pair of rotational driving shafts on a guide body in a carriage wherein the guide body is reciprocally movable in a direction at right angles relative to a moving direction of the carriage, and the rotational shafts have joints at the ends of the rotary shaft and the rotational shaft is driven by the reversing motor whereas the rotational shaft is driven by the motor.

The joint of the rotational shaft is engageable with the joint of the driving device, and the joint of the other rotational shaft is engageable with the other joint.

PREFERRED EMBODIMENTS OF THE INVENTION

Preferred embodiments of the present invention will be described with reference to the accompanying drawings.

Figure 1:
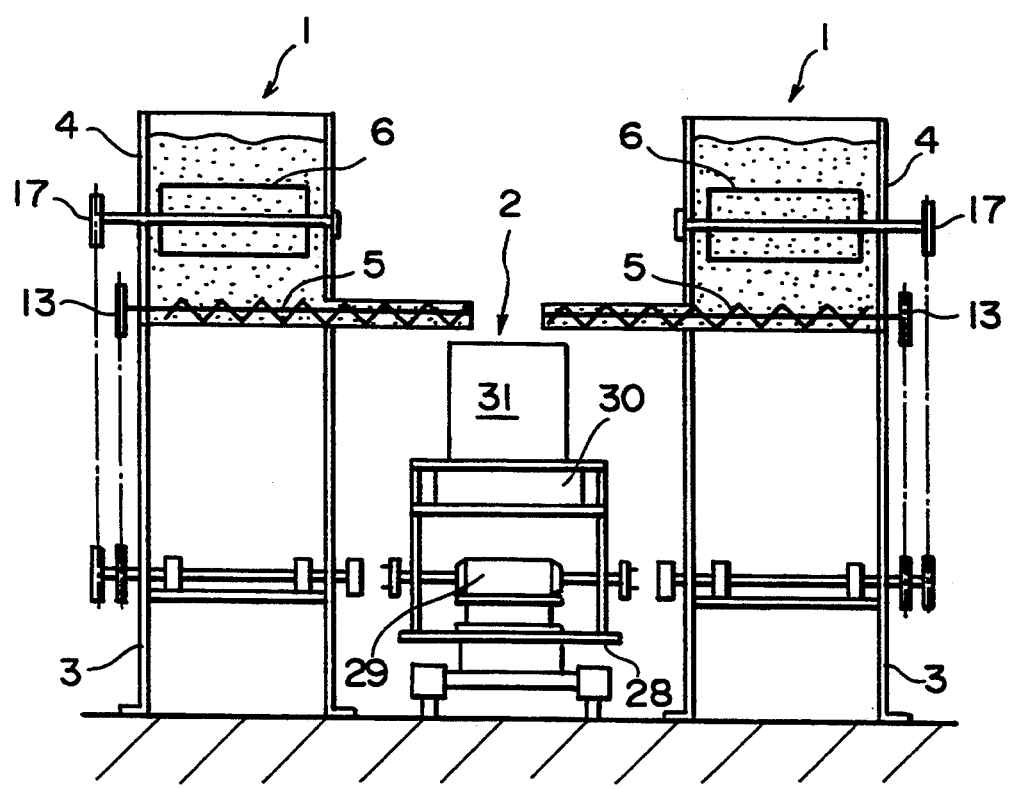
FIG. 1 is a front view of the apparatus of the present invention showing a generally entire structure.

In FIG. 1 showing the entire structure of the mixing apparatus according to the present invention, a container device 1 contains and holds therein a predetermined powder materials (hereinafter referred to as basic materials or materials), and a movement device 2 receives a predetermined volume of the materials which are supplied by the container device 1.

Figure 2:
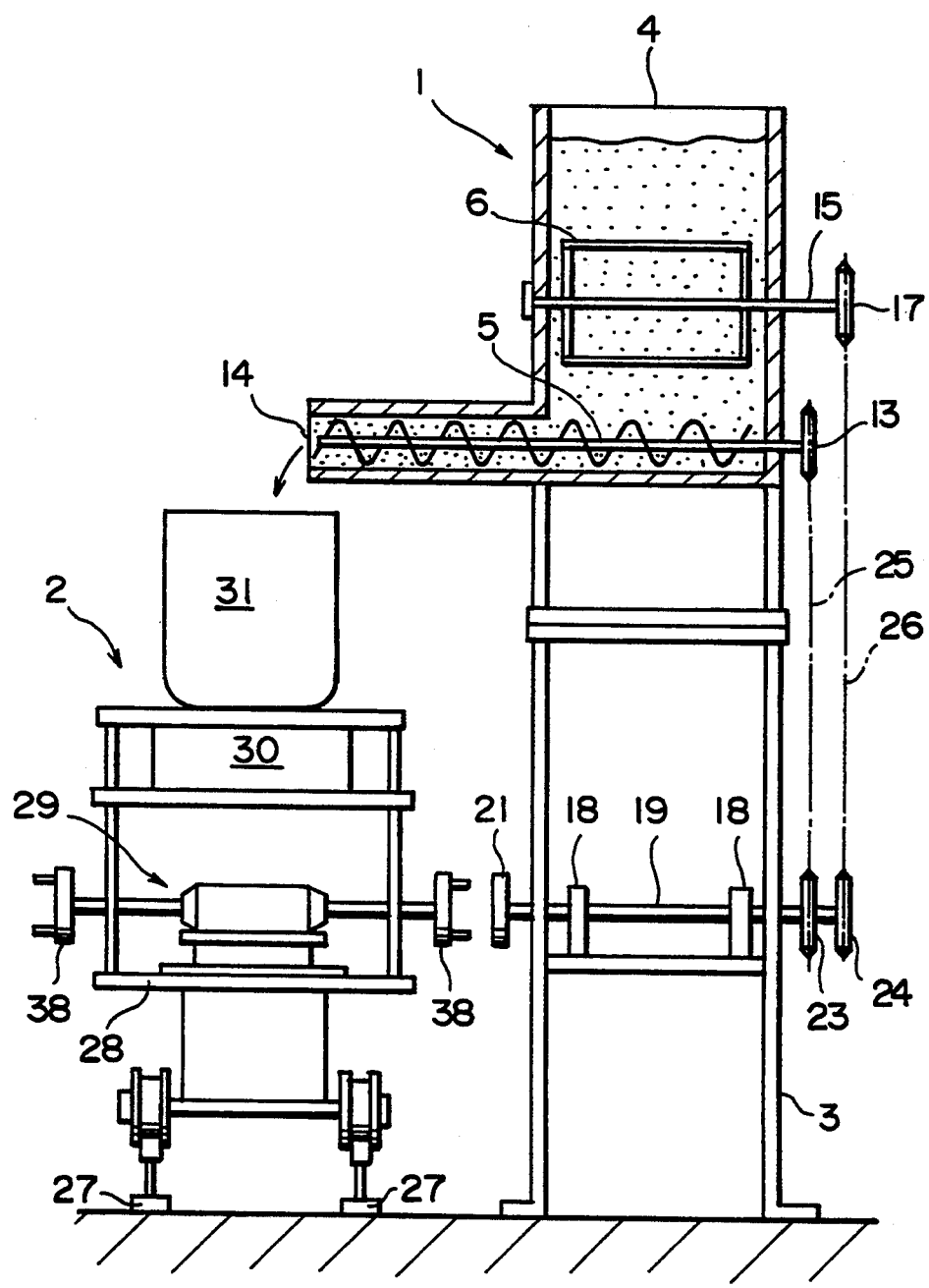
FIG. 2 is a front view of the apparatus showing a selected container device and a movement device.
Figure 3:
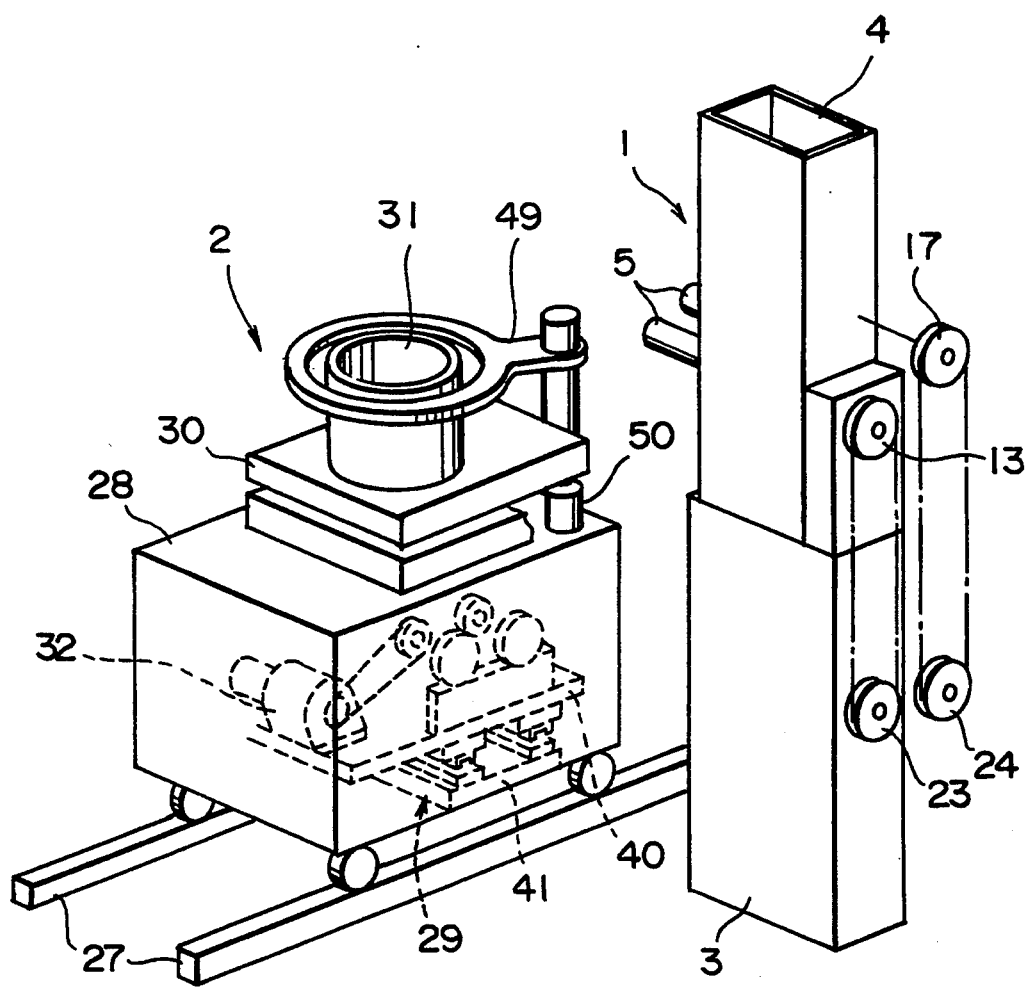
FIG. 3 is a perspective view of the selected container device and the movement device.

The container device 1 has a container vessel 4 on a base 3, a screw conveyer device 5 at a lower portion in the container vessel 4 and, above the screw conveyer device 5, a bridge breaker or agitator 6 at an upper portion in the container vessel 4 as illustrated in FIGS. 2 and 3.

The screw conveyer device 5 has a pair of screw conveyers 5a, 5b having vanes of a different pitch and diameter. The large conveyer 5a has a spiral vane of larger diameter and pitch for discharging a large volume of the basic materials and a small conveyer 5b has a spiral vane of smaller diameter and pitch for discharging a small volume of the basic material.

Figure 4:
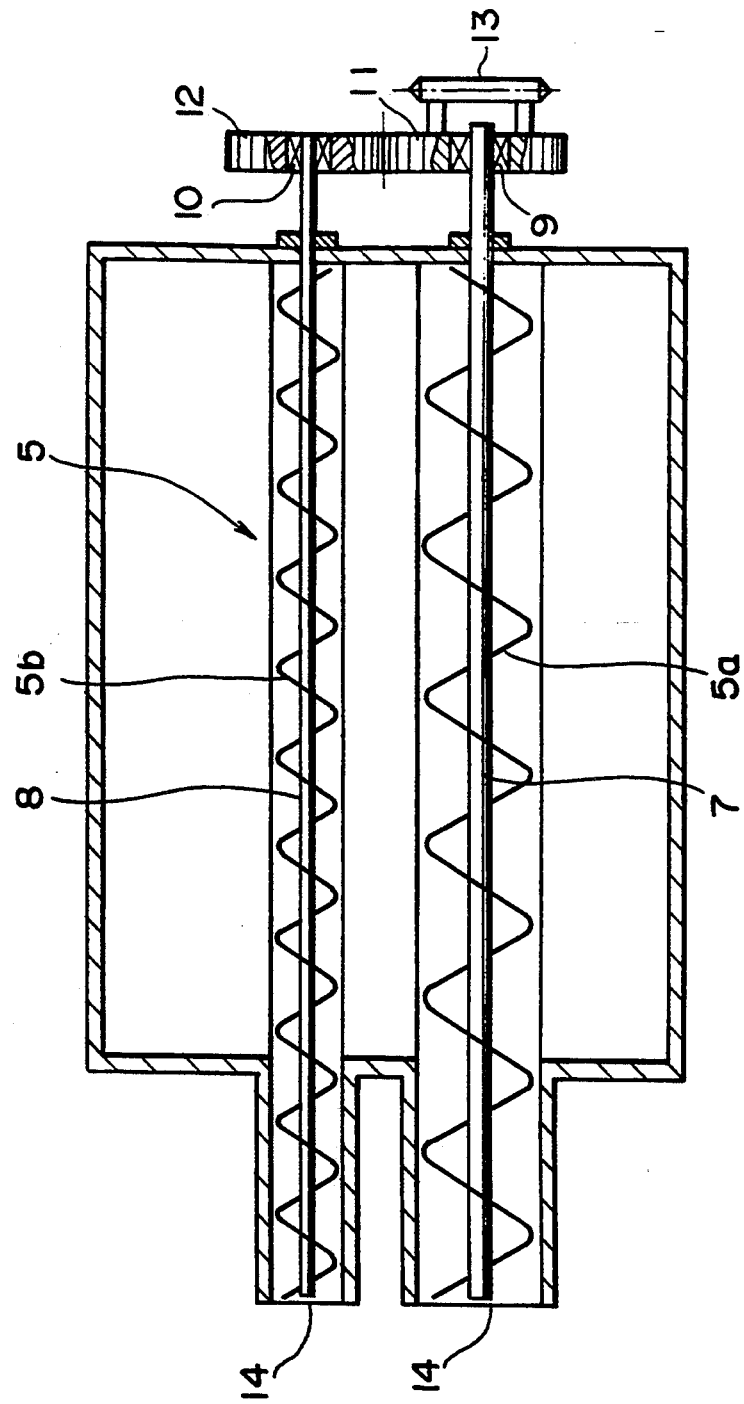
FIG. 4 is a plan view of a conveyer device with the container device being transversely sectioned.

The screw conveyers 5a, 5b have shafts 7, 8, respectively, which extend out of the container vessel 1 and engaged with cam clutches 9, 10 and gears 11, 12 disposed around the cam clutches, as shown in FIG. 4. The gears 11, 12 are engaged with each other. One of the gears, for example, the gear 11 of the conveyer 5a, is provided with a sprocket 13 which is fixed to the gear 11 concentrically.

When the screw conveyers 5a, 5b are driven to rotate the vanes, the basic materials in the container vessel 4 is taken out and discharged from the outlet 14. The screw conveyers 5a, 5b are not driven simultaneously but driven alternately and separately.

Figure 5:
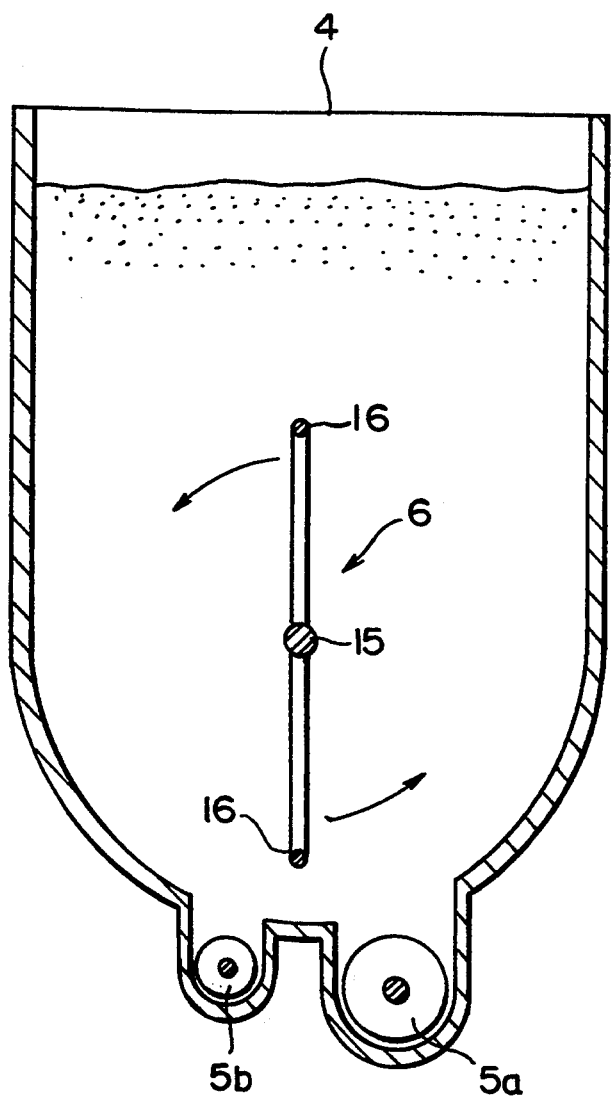
FIG. 5 is a longitudinal sectional view of the container vessel of the container device.

The bridge breaker 6 has, as shown in FIG. 5, a rotational shaft 15 and rotary bars 16 fixed to the rotational shaft 15 in a horizontal position. The rotary bars 16 are rotated circumferentially by the rotation of the rotational shaft 15. One end of the rotational shaft 15 is extended out of the container vessel 4 and has a sprocket 17 at the end of the extended portion.

The bridge breaker 6 can be formed such that a plurality of bars are extended at right angles to the rotational shaft 15 so that the bars are rotated by the rotation of the shaft 15. Other desired structure can be applied if the basic materials can be agitated to prevent generation of bridge phenomena of the basic materials bridging to an inner surface of the container vessel 4.

Figure 6:
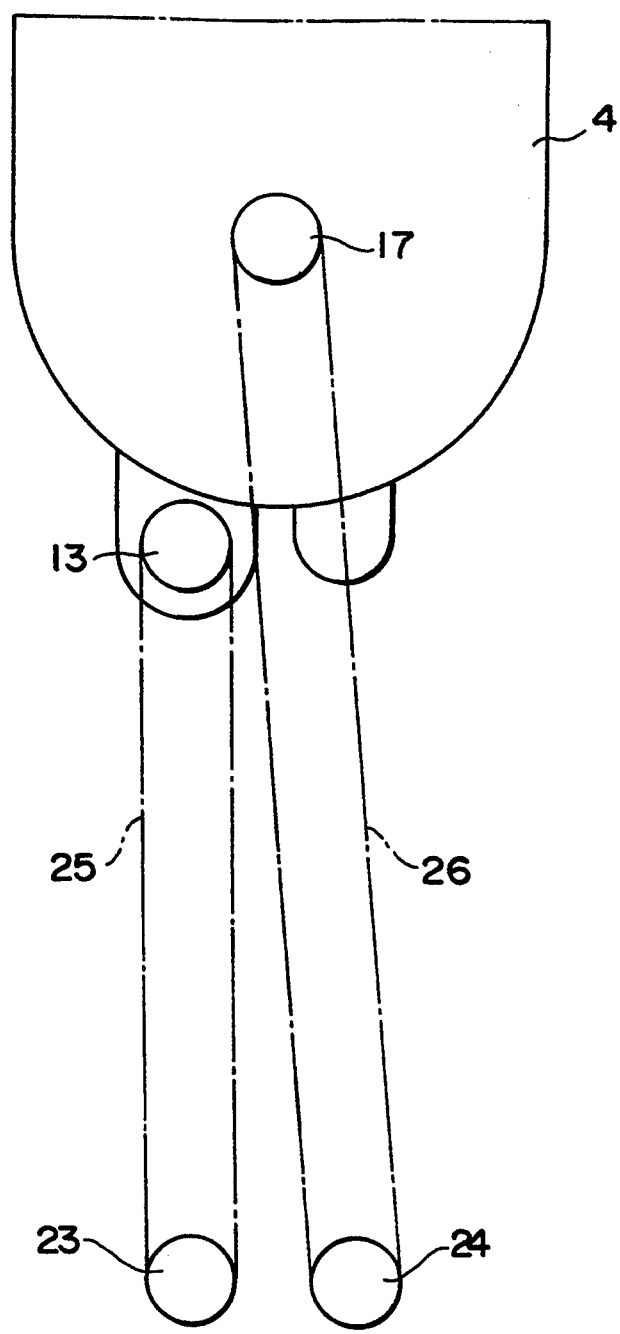
FIG. 6 is a side view of a driving mechanism for the conveyer device and a bridge breaker.
Figure 7:
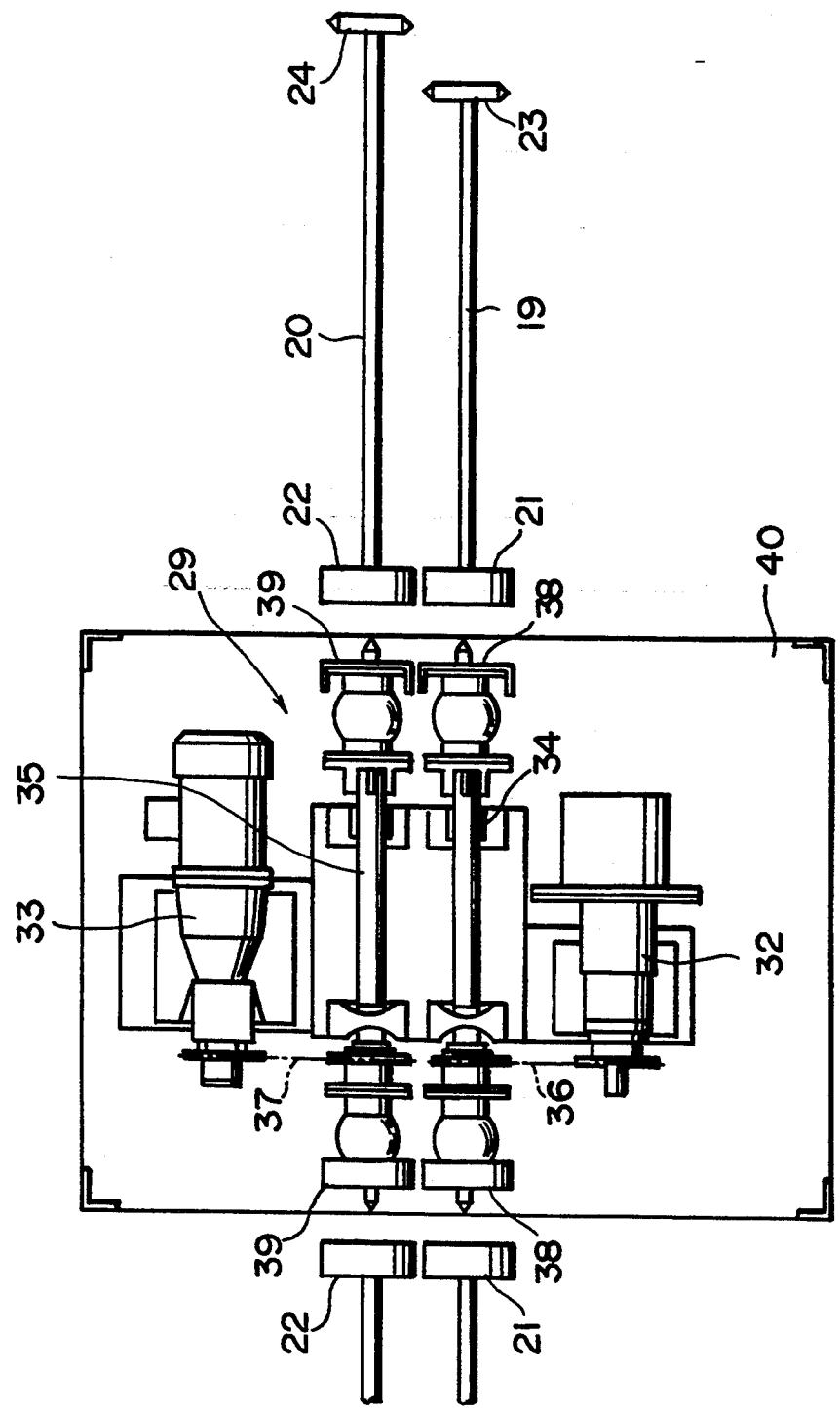
FIG. 7 is a plan view of the driving mechanism for the conveyer device and the bridge breaker.

The container device 1 has a driving mechanism for rotating the screw conveyer 5 and the bridge breaker 6. The driving mechanism has two rotational shafts 19, 20, with connectors or joints 21, 22 coupled to one end thereof and sprockets 23, 24 at the other end as illustrated in FIG. 7. As shown in FIG. 6, the sprocket 23 is coupled to the sprocket 13, and the remaining sprocket 24 is coupled to the other sprocket 17, by means of chains 25, 26, respectively.

If the joints 21, 22 are rotated by means of a driving device, which will described presently, the screw conveyer 5 is rotated through the sprocket 23, chain 25 and sprocket 13. Similarly, the bridge breaker 6 is rotated through the sprocket 24, chain 26 and sprocket 17.

The cam clutches 9, 10 fixed to the screw conveyers 5a, 5b, respectively, are rotated in one and opposite direction to each other. Thus, when the rotational shaft 7 is rotated in a clockwise direction through the sprocket 13, the cam clutch 10 of the other rotational shaft 8 is rotated freely and, therefore, a rotational force of the gear 11 is not transmitted by way of the gear 12 to the rotational shaft 8.

When the connector 21 is reversely rotated, the cam clutch 9 of the rotational shaft 7 of the large screw conveyer 5a is rotated freely and, in this case, the gear 12 is rotated through the gear 11. Thus, the rotational shaft 7 is not rotated but only the rotational shaft of the small screw conveyer 5b is rotated.

The movement device 2 has the driving device 29 disposed on the carriage 28 movable on the rails 27 and, above the driving device 29, a weighing apparatus such as an electronic weight checker 30 and a mixing container 31 positioned on the weight checker 30.

Figure 8:
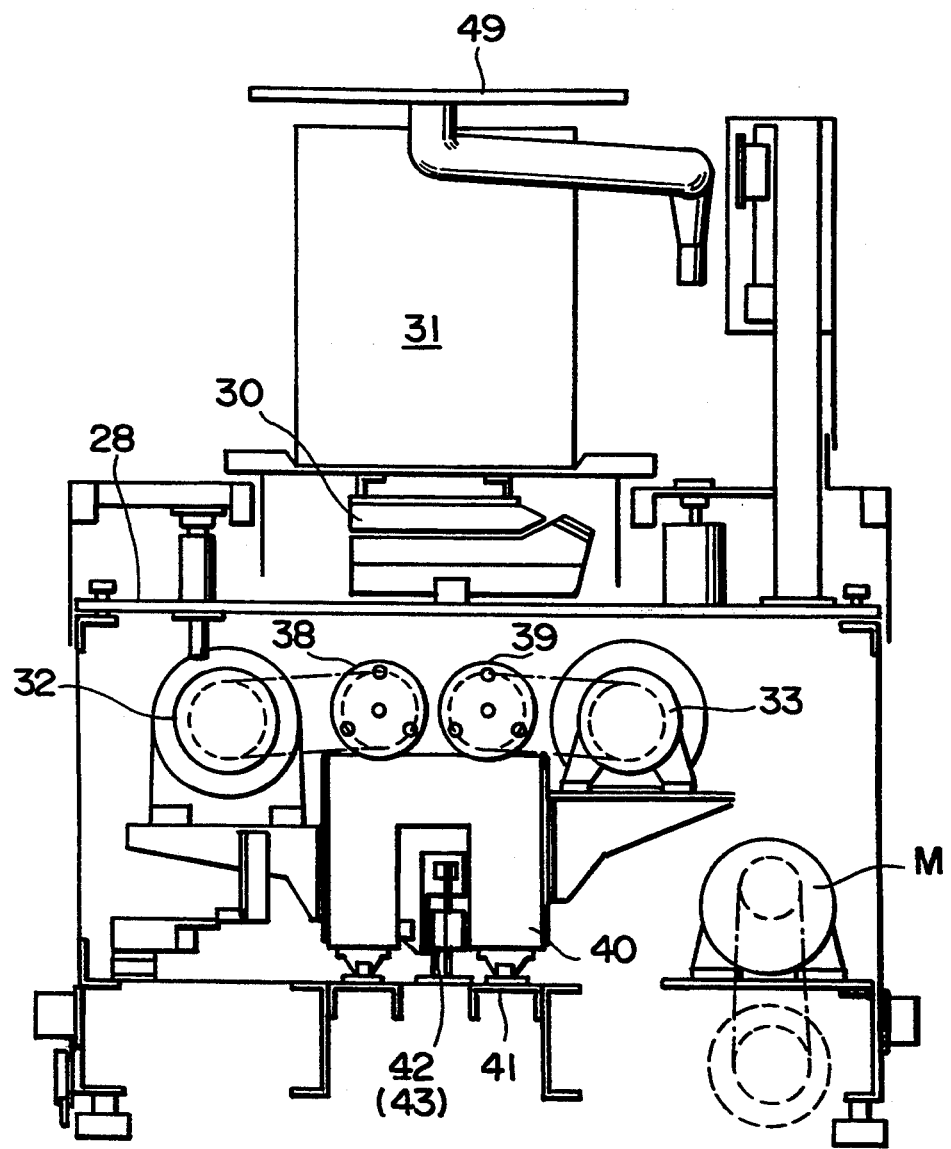
FIG. 8 is a side view of a carriage, seen from an inside.

The driving device 29 has two motors 32, 33 and two rotating members 34, 35 as shown in FIGS. 7 and 8. The motor 32 drives the screw conveyer device 5 and the rotating member 34 through a chain 36. The other motor 33 drives the bridge breaker 6 which agitates the base materials, and the rotating member 35 through a chain 37. In FIG. 8, reference character M represents a motor for driving the carriage on the rails 27.

The rotating members 34, 35 have connectors or joints 38, 39 at the ends thereof, and the joint 38 is bidirectionally rotatable by the motor 32 which is reversely rotatable.

The joint 38 of the rotating member 34 is positioned in a facewise abutment relation with the joint 21 for the container device 1 and, similarly, the joint 39 of the rotating member 35 is positioned in a facewise abutment relation with the joint 22.

The motors 32, 33 and rotating members 34, 35 are fixed to a movement body 40 in the carriage 28, and the carriage 40 is reciprocally movable at right angles to the moving direction of the carriage 28.

Figure 9:
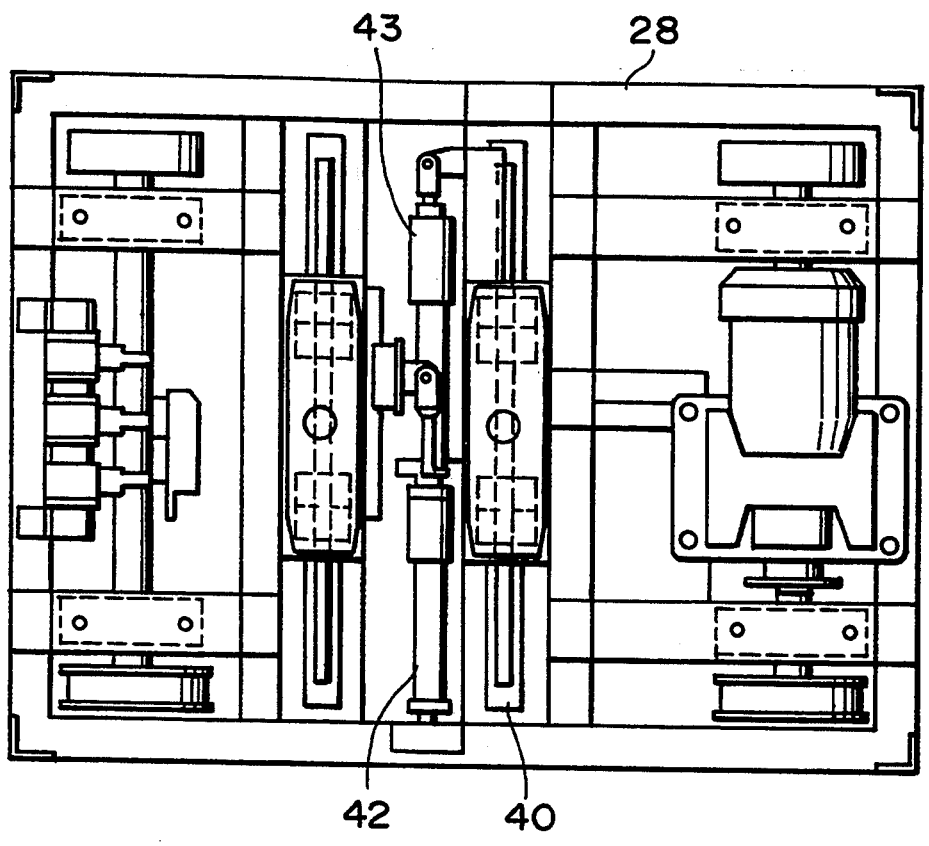
FIG. 9 is a bottom view of the carriage and the movement device.
Figure 10:
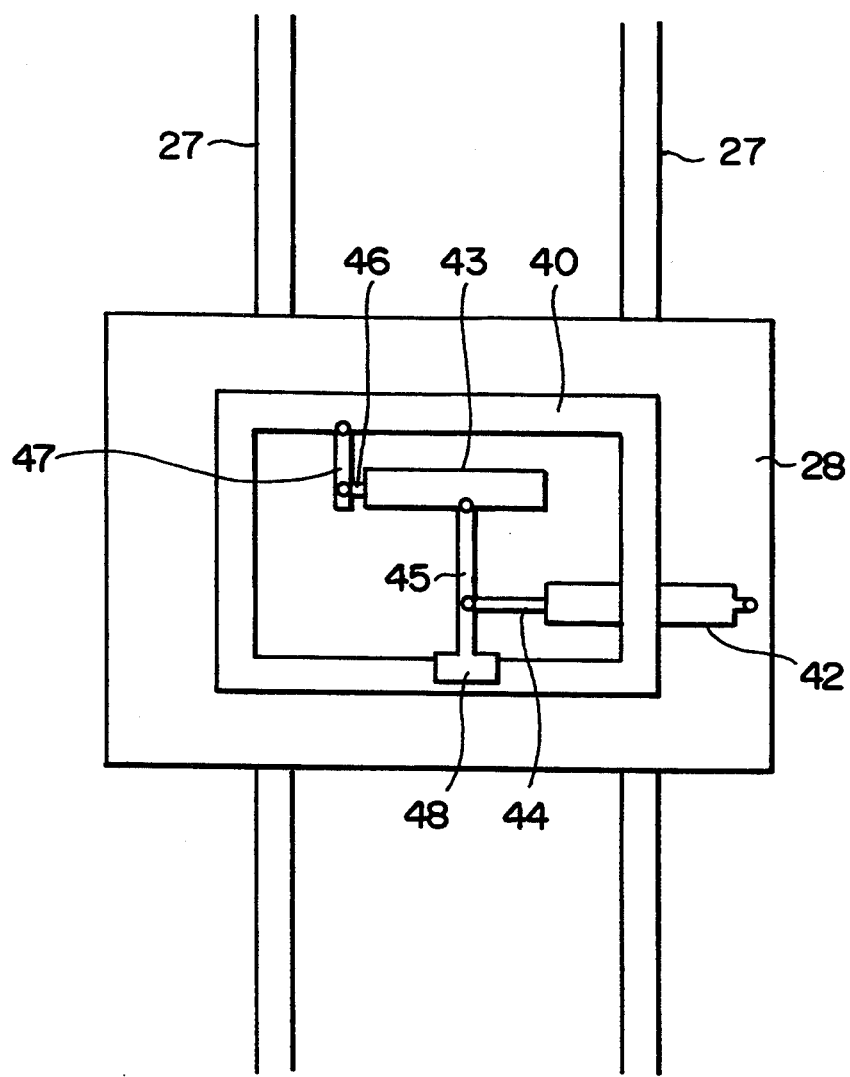
FIG. 10 is a plan view showing the movement device is moved to a right side relative to the carriage.

The reciprocal movement of the movement body 40 on the carriage 41 is made by the cylinders 42, 43. These cylinders 42, 43 are disposed at a lower position in the movement body 40 as shown in FIGS. 8, 9 and 10. The cylinder 42 is fixed at its base portion to the carriage 28 and its rod 44 is fixed to the other cylinder 43 through a connector 45. The cylinder 43 has a rod 46 which is fixed to the movement body 40 through a connector 47. One end of the connector 45 is fixed to the cylinder 43 and the other end is free and slidable.

Figure 11:
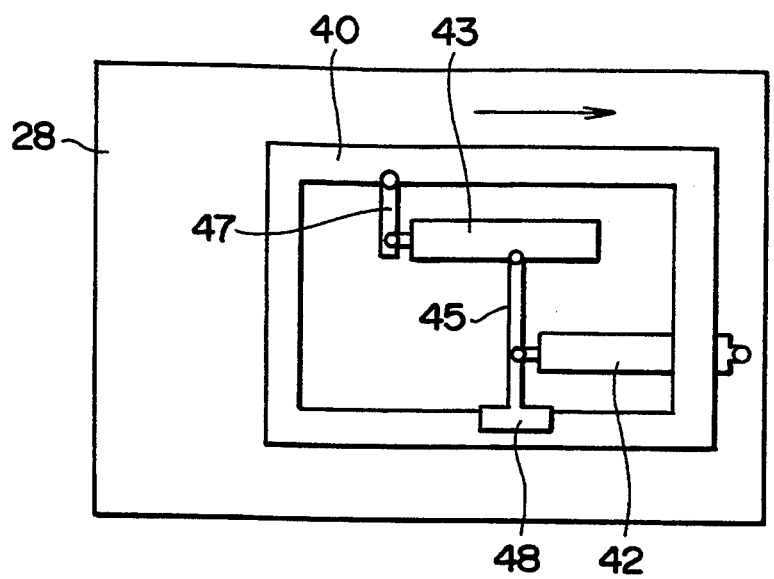
FIG. 11 is a plan view showing the movement device is moved to a right side.

An operation of the cylinders 42, 43 will be described with reference to FIGS. 10, 11 and 12.

FIG. 10 shows the cylinders 42, 43 in a neutral position and the movement body 40 is located at a central position of the carriage 28. The joints 38, 39 for the rotating members 34, 35 are in a spaced confronting relation with the joints 21, 22 for the container device 1 (FIG. 7). When the rod 44 of the cylinder 42 is retracted or pulled into the cylinder as shown in FIG. 11, the movement body 40 is moved to a right side of the drawing as shown by an arrow by the connector 45, cylinder 43, rod 46 and connector 47. By the right side movement of the movement body 40, the joints 38, 39 (FIG. 7) are extended out of the carriage 28. If the rod 44 is extended, the movement body 40 is returned to the original position.

Figure 12:
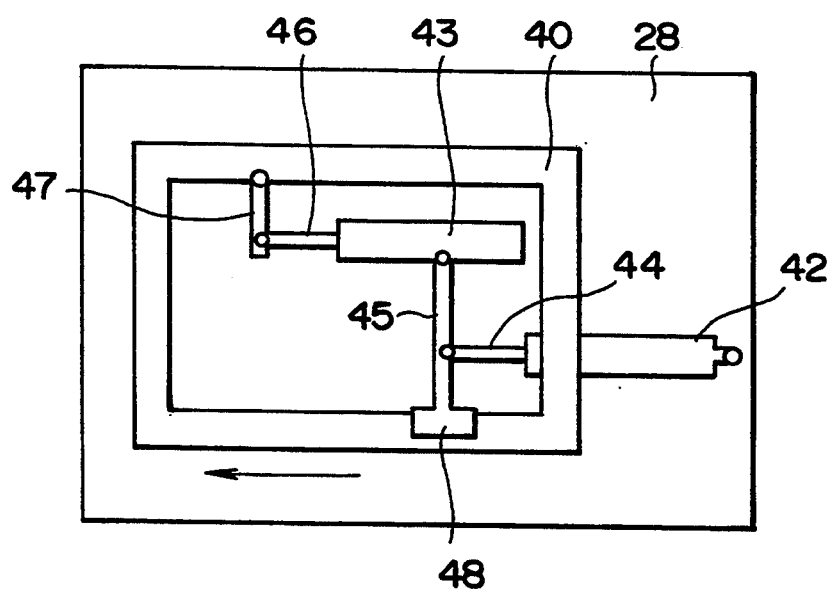
FIG. 12 is a plan view showing the movement device is moved to a left side.

If the rod 46 of the cylinder 43 is extended in the neutral position of FIG. 10, the movement body 40 is moved in a left side direction, as shown in FIG. 12. By this movement, the joints 38, 39 which are positioned at the left side in FIG. 7 are extended out of the carriage 28. By the actuation of the cylinders in an alternate manner, the movement body 40 can be reciprocated or moved back and forth at right angles relative to the moving direction of the carriage 28.

The connector 45 has at its free end a slide guide 48, which supports a load of a front end of the cylinder 42 and a load of a rear end of the cylinder 43, and facilitates the movement of the movement body 40 in the opposite (left and right) directions.

In the illustrated embodiment, two cylinders are used but only a single cylinder can be used to move the movement body 40 by extending and retracting actuation of the rod thereof.

An operation of the container device 1 and the movement device 2 as a mixing apparatus will be described.

Figure 13:
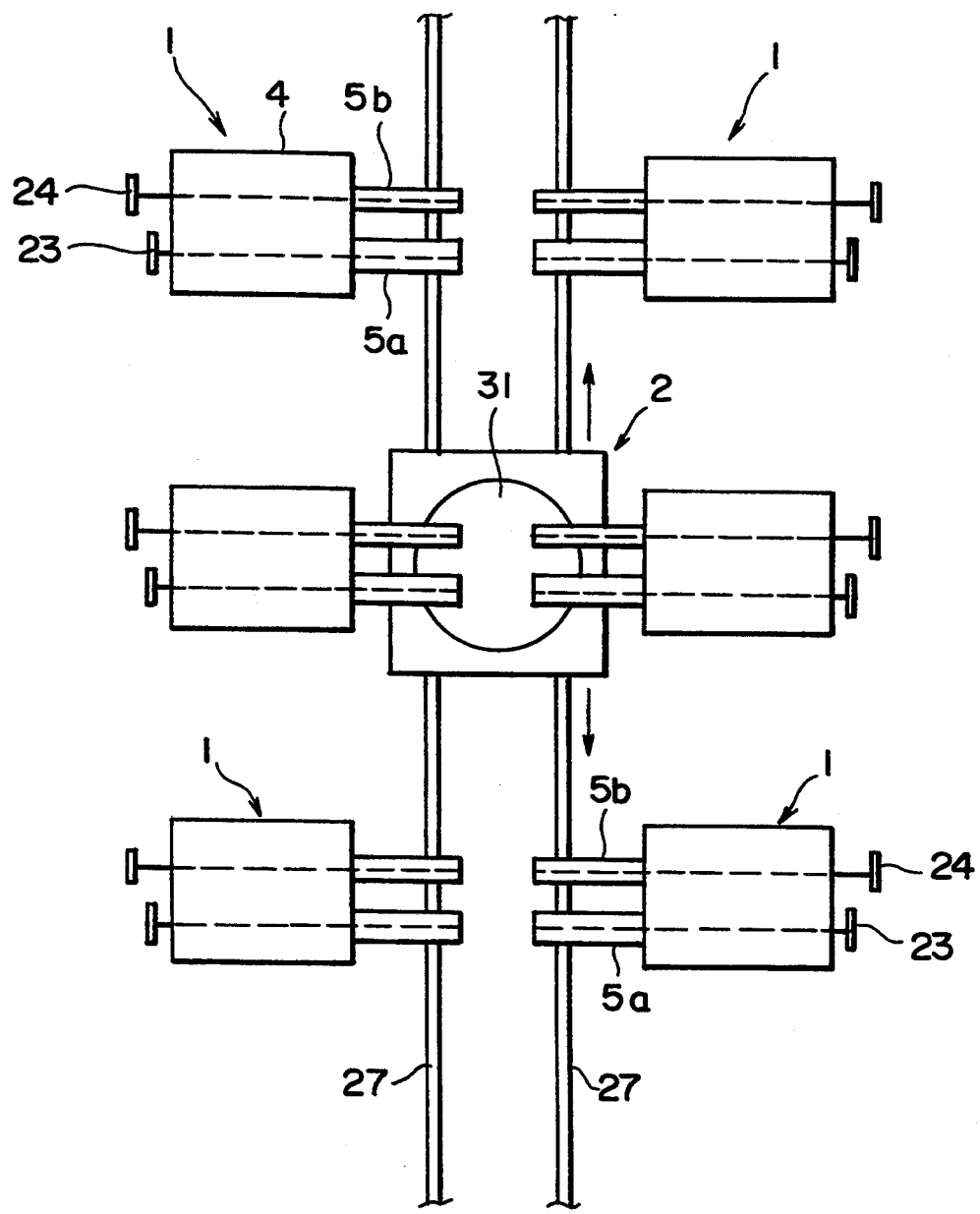
FIG. 13 is a diagrammatic plan view of a mixing apparatus according to the invention.

As shown in FIG. 13, a plurality of container devices 1 of the same construction are arranged in series and in a symmetrical opposed relation. The container device 1 contains a powder material which is different in ingredient from that of another container device 1 so that each container contains different base materials.

The movement device 2 is reciprocally moved on the rails 27 between the container devices 1, 1 of opposite sides, and stopped at the position of a selected container device. The movement and stop of the movement device 2 is controlled by an electronic computer.

FIG. 2 shows a state that the movement device 2 is stopped in front of the selected container device 1 of the arranged container devices of a right side row. When the movement body 40 is moved toward a right side by the cylinder 42, the joints 38, 39 are extended outwardly from the carriage 28, the joints 38, 39 are coupled with the joints 21, 22, respectively. When the motors 32, 33 are driven, the rotating members 34, 35 are rotated so that the joints 21 22 are rotated in turn through the joints 38, 39. By the rotation of the connectors 21, 22, the sprockets 23, 24 are simultaneously rotated and, accordingly, the sprockets 13, 17 are simultaneously rotated through the chains 25, 26.

In this state, the large screw conveyer 5a is driven so that the basic material in the container vessel 4 is advanced by a rotation of the spiral vane and discharged from the outlet 14 and then supplied to the mixing container 31. At this moment, the bridge breaker 6 is also rotated.

When the motor 32 is stopped and then rotated in the opposite direction, the sprockets 38 and 21 are then rotated in the opposite direction, and the gear 12 is driven by the gear 11 to rotate the small screw conveyer 5b, so that a small volume of the basic materials is supplied from the outlet 14 to the mixing container 31.

After the predetermined volume of the basic materials in the selected container device 1 is supplied to the mixing container 31, the movement device 2 is moved to the next selected container device 1 and a similar operation as described above is repeated so that different basic materials in the different container devices 1 are supplied to the mixing container 31.

The selection of the container device 1 and operation of the various rotary movement devices such as the movement device 2, screw conveyer device 5 and bridge breaker 6, and operation of the weighing device 30 are all controlled by an electronic computer, not shown, in a known and desirable manner.

The description has been made with reference the a case in which the basic materials are supplied from the selected container device 1 of a right side row, and it will be appreciated that a similar operation can be carried out in case of the container devices of a left side row. Therefore, the rotating members 34, 35 of the driving device 29 are provided with joints 38, 39 on opposite ends thereof in a symmetrical manner as illustrated in FIG. 7.

The operation and control of the large screw conveyer 5a and the small screw conveyer 5b will be described. Supposing that the volume of the basic materials supplied from the container vessel 4 of a selected container device 1 is set to be, for example, 5 kg, the material of 4 kg is first discharged by means of the large screw conveyer 5a and then a remaining volume of the material of 1 kg is discharged by means of the small screw conveyer 5b.

Figure 14:
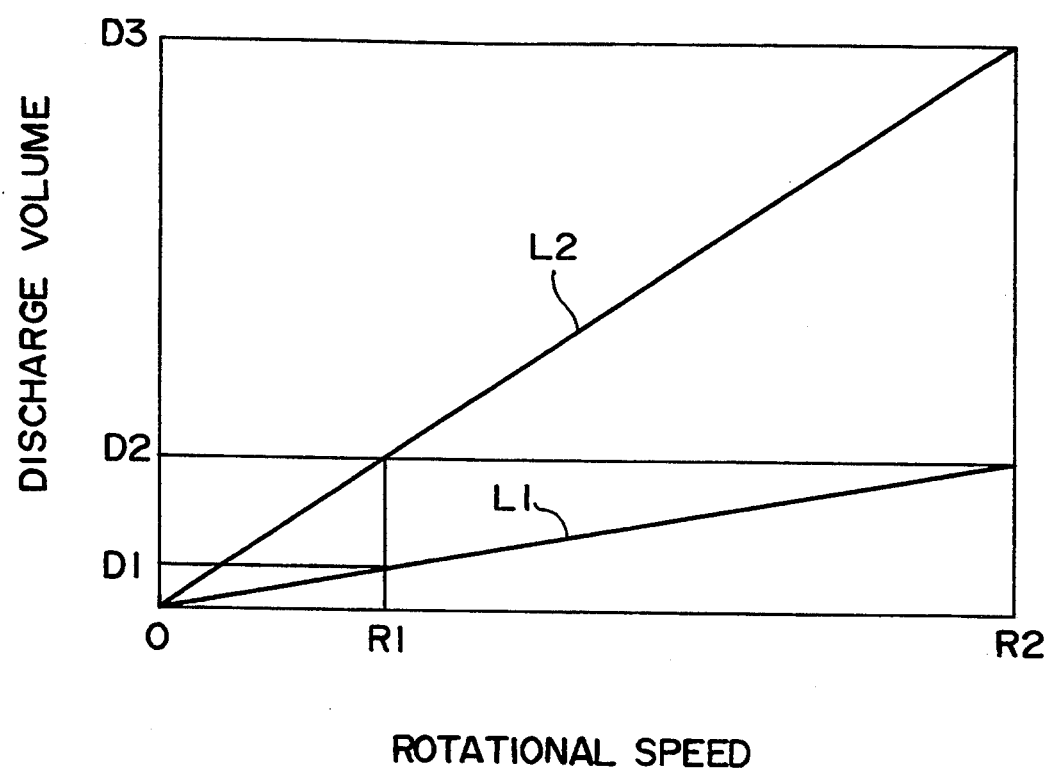
FIG. 14 is a graph showing the relation between a rotational speed of the conveyer device and a discharge volume of the materials.
Figure 15:
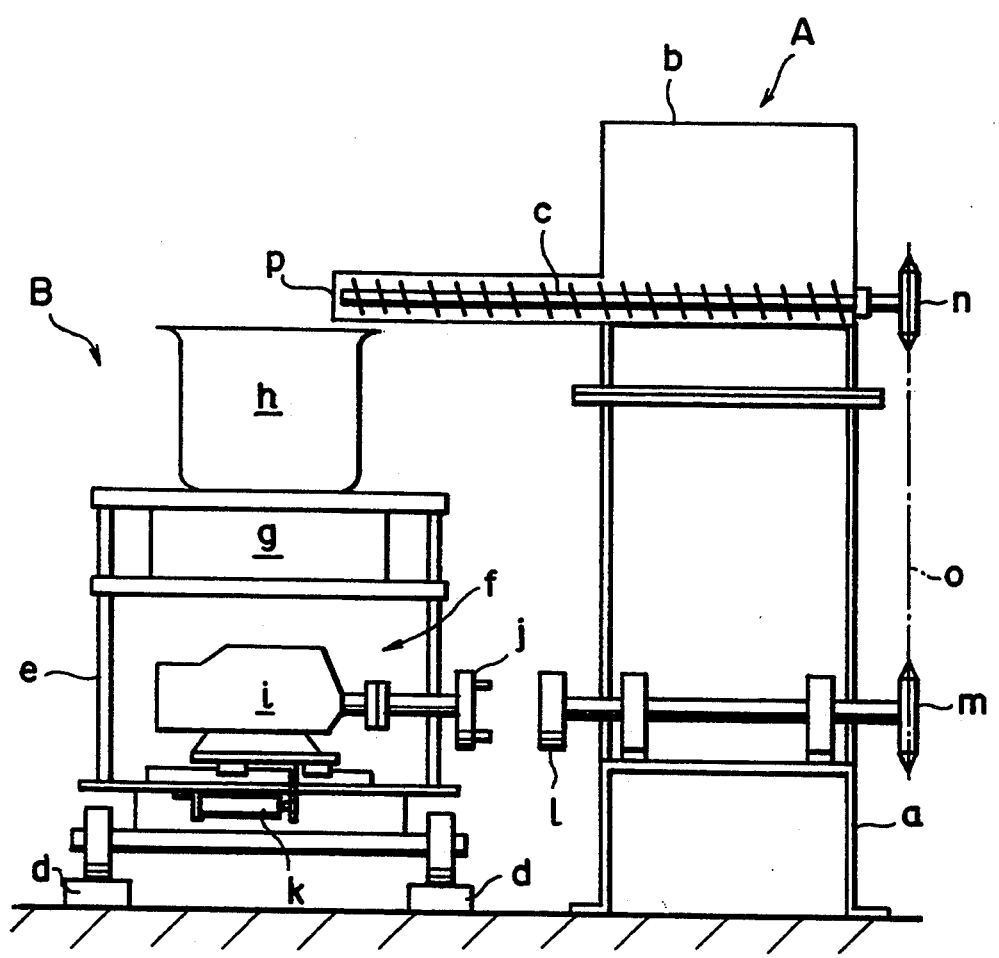
FIG. 15 is front view of the conventional mixing apparatus.

With reference to FIG. 14, the volume of the basic materials discharged by the spiral vane of the small screw conveyer 5b is linearly increased from a position D1 to a position D2 as the increase of rotational speed of the conveyer vane, between the minimum rotational speed R1 and the maximum rotational speed R2 as shown by a line L1. On the other hand, with reference to the volume of the basic material discharged by the large screw conveyer 5a, the diameter and pitch of the spiral vane of this large screw conveyer 5a are determined so that the discharge volume D2 at the minimum rotational speed R1 is substantially equal to or slightly smaller than a maximum discharge volume of the material discharged by the small screw conveyer 5b. Therefore, a maximum discharge volume of the material discharged by the large screw conveyer 5a is represented by D3 at a maximum rotational speed R2.

Thus, the large screw conveyer 5a and the small screw conveyer 5b are separately operated and, a desired volume of the materials within a relatively large range from the position D1 to the position D3 can be discharged.

In a discharging operation of the basic materials from the container vessel 4 (in the volume of 2 kg–20 kg), at an accuracy of ±1% within a predetermined period of time (for example, 60 seconds), operation of the two screw conveyers 5a, 5b is carried out as set forth below.

A discharging is made by the large screw conveyer 5a so that a range including an error of $3\sigma$ ($\sigma$: standard deviation) at 100–2 RPM becomes 90% of the set value (for example, 5 kg), and the remaining volume of 10% of the materials is discharged by the small screw conveyer 5b at 100–2 RPM, and the accuracy is determined to be the errors being $3\sigma$ or less.

For example, if the size is determined such that a diameter of the spiral vane of the large screw conveyer 5a is 100$\phi$ and diameter of the spiral vane of the small screw conveyer 5b is 32$\phi$, the volumes of discharged materials are 42 kg/min by the large screw conveyer 5a and 10 kg/min by the small screw conveyer 5b, provided that the apparent density of the powder material is 0.5. When the base material of 5 kg with an error of ±1% (that is, ±50 g) is obtained within about 10 seconds, it takes 6.4 seconds to obtain 4.5 kg by the large screw conveyer 5a, and three (3) seconds to obtain remaining 0.5 kg by the small screw conveyer 5b, and thus it takes in total 9.4 seconds to obtain the predetermined volume of 5 kg.

With reference to the accuracy, at the minimum rotational speed of 2 R/M of the small screw conveyer 5b, a volume of 20 g is obtained by a formula: 20 cc (a volume per rotation of the conveyer 5b)×2 R/M=400 cc=20 g. Thus, the volume of 50 g can be maintained by a rotational speed of 5 R/M.

As described above, it is possible that a large volume of the material is obtained by the large screw conveyer 5a and a small volume of the material is obtained by the small screw conveyer 5b with fine adjustment.

With reference to FIGS. 3 and 8, a powder collection hood 49 is provided to collect floating powder materials. When the base materials are supplied from the outlets 14 of the container vessel 4, the materials are partly floated and in some cases the floating powders are leaked out of the apparatus, with the result of contamination of the circumference of the movement device 2. Further, it is difficult to collect the leaked powder and is unfavorable from an economical point of view.

The hood 49 is positioned adjacent to an opening of the mixing container 31 at the time of supplying the base materials to suck the floating powder materials by an air suction. The sucked powders are collected by a filter, not shown. The hood 49 is movable upwardly and downwardly by a cylinder 50. After the supply of the base materials from the container devices 1 is finished and the mixing container 31 is removed from the weighing device 30, the hood 49 is lifted upward above the mixing container 31.

According to the present invention, necessary base materials are supplied from the selected container devices 1 which contain different base materials to the mixing container 31 for the predetermined, necessary volume of the materials. Further, a plurality of container devices 1 are installed on both sides in a symmetrical manner and, therefore, a number of container devices can be provided in a limited space or area for installment. Thus, many kinds of base materials can be widely selected and mixing of the base materials can be carried out effectively.

Since the diameter and pitch of the spiral vanes of the screw conveyers 5a, 5b are set different from each other so that a discharged volume by each of the conveyers 5a, 5b is different, a substantial volume of the base materials to be obtained is taken out and discharged by the large screw conveyer 5a, and a remaining small volume of the base materials is fine-adjusted, taken out and discharged by the small screw conveyer 5b. Therefore, a volume of the base materials to be contained in each of the container devices can be weighed in an extremely high accuracy. Thus, there is no danger or fear of unnecessary discharge of the base materials due to rotational inertia of the conveyer device 5, and the base materials are not discharged more than necessity.

Further, combination of the large and small conveyers can provide a desirable and highly accurate discharging operation in a limited period of time.

In many cases the powder base materials are easily fixed to an inner surface of the container vessel 4 to produce a bridge phenomenon which prevents a constant volume discharging operation by the conveyer device 5. According to the present invention, however, the bridge breaker 6 or a suitable agitator is provided to break such a bridge phenomenon to thereby provide a constant discharge volume of the materials.

What is claimed is:

1. A powder mixing apparatus, comprising:
   (a) a plurality of container devices, comprising a first set of container devices arranged in a first row extending along a first direction and a second set of container devices extending in a second row and along the first direction, the first and second rows being parallel to one another and opposing one another, each container device comprising:
       a base,
       a container vessel disposed on said base for containing therein powder material to be mixed,
       a means for conveying powder material in the container vessel, said means for conveying disposed at a lower portion of said container vessel,
       a means for agitating powder material in said container vessel, said means for agitating disposed at an upper portion of said container vessel, and
       a driving mechanism for operating said means for conveying and means for agitating,
   (b) a movement device, which is movable along the first direction and is located between the two parallel rows of container devices, said movement device comprising a driving device and means for releasably connecting the driving device to the driving mechanism to thereby drive the driving mechanism, a mixing vessel for receiving powder materials from the means for conveying, and a weighing device for weighing the powder materials supplied from the means for conveying to the mixing vessel; and
   wherein said driving device comprises a carriage, a guide body in the carriage, at least one motor that is mounted on the guide body, first and second rotational driving shafts that are mounted on the guide body and that are driven by said at least one motor, respectively, and means for reciprocally moving the guide body in a direction that is perpendicular to said first direction; and
   wherein both ends of each of the first and second rotational shafts include joints for engaging the driving mechanisms of said container devices in both of said first and second rows of container devices.

2. An apparatus according to claim 1, wherein said driving mechanism comprises a first means for driving said means for conveying and a second means for driving said means for agitating;
   wherein said first means for driving the means for conveying comprises a first rotary shaft having a first sprocket at one end and a first joint at the other end thereof, and said second means for driving the means for agitating comprises a second rotary shaft having a second sprocket at one end and a second joint at the other end thereof.

3. An apparatus according to claim 2, wherein one of the joints of the first rotational shaft is releasably engaged with the first joint of the first rotary shaft of the first means for driving of the driving mechanism and one of the joints of the second rotational shaft is releasably engaged with the second joint of the second rotary shaft of the second means for driving of the driving mechanism.

4. An apparatus according to claim 1, wherein each of the first and second sets of container devices comprises at least three container devices.

5. An apparatus according to claim 1, wherein the means for conveying comprises a pair of screw conveyers consisting of a first conveyer having a large spiral vane of a relatively large diameter and a relatively large pitch on a first rotary screw shaft, and a second conveyor having a relatively small spiral vane, diameter, and pitch, on a second rotary screw shaft.

6. A powder mixing apparatus according to claim 5, wherein said first rotary screw shaft of said first conveyer has a first cam clutch and a first gear, said second rotary screw shaft of said second conveyer has a second cam clutch and a second gear, and wherein said first and second gears are engaged with each other and said first and second cam clutches rotate in opposite directions.

7. A powder mixing apparatus according to claim 1, wherein said means for agitating comprises a bridge breaker comprising a bridge breaker rotational shaft and a plurality of bars that are fixed to the bridge breaker rotational shaft so that the plurality of bars are rotated when said bridge breaker rotational shaft is rotated.

* * * * *